United States Patent
Fouarge et al.

(10) Patent No.: US 7,329,712 B2
(45) Date of Patent: Feb. 12, 2008

(54) SWELL CONTROL IN SLURRY LOOP REACTOR

(75) Inventors: Louis Fouarge, Dilbeek (BE); Andre Lewalle, Brussels (BE); Marc Van der Auwera, Tervuren (BE); Frans Van Den Brande, Mortsel (BE)

(73) Assignee: Total Petrochemicals Research Feluy, Feluy (BE)

( * ) Notice: Subject to any disclaimer, the term of this patent is extended or adjusted under 35 U.S.C. 154(b) by 180 days.

(21) Appl. No.: 11/499,473

(22) Filed: Jul. 27, 2006

(65) Prior Publication Data

US 2007/0032613 A1     Feb. 8, 2007

(51) Int. Cl.
*C08F 2/12*    (2006.01)

(52) U.S. Cl. ............................. 526/59; 526/64; 700/269

(58) Field of Classification Search .................. 526/59, 526/64; 700/269
See application file for complete search history.

(56) References Cited

U.S. PATENT DOCUMENTS 6,627,707 B2 * 9/2003 McDaniel et al. ............. 526/64
2006/0094835 A1 * 5/2006 Fouarge et al. ............... 526/64

FOREIGN PATENT DOCUMENTS

CA    2023745    * 5/1991

* cited by examiner

*Primary Examiner*—Fred Teskin
(74) *Attorney, Agent, or Firm*—William D. Jackson

(57) ABSTRACT

The present invention discloses a method for controlling the onset and development of swelling in a slurry loop reactor by progressively diluting the reactor, the amount of dilution being driven by the amplitude of the fluctuations measured on some plant measurement.

12 Claims, 4 Drawing Sheets

SWELL CONTROL IN SLURRY LOOP REACTOR

The present invention relates to the field of polymerisation of olefin in a slurry loop reactor.

High density polyethylene (HDPE) was first produced by addition polymerization carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerization effluent is formed which is a slurry of particulate polymer solids suspended in a liquid medium, ordinarily the reaction diluent and unreacted monomer (see for Example U.S. Pat. No. 2,285,721). It is desirable to separate the polymer and the liquid medium comprising an inert diluent and unreacted monomers without exposing the liquid medium to contamination so that said liquid medium can be recycled to the polymerization zone with minimal or no purification. As described in U.S. Pat. No. 3,152,872, a slurry of polymer and the liquid medium is collected in one or more settling legs of the slurry loop reactor from which the slurry is periodically discharged to a flash chamber thus operating in a batch-wise manner.

The mixture is flashed in order to remove the liquid medium from the polymer fluff. It is afterwards necessary to recompress the vaporized polymerization diluent to recondition and purify it.

Due to economical incentives, the reactor is generally pushed to its limits of operability. High concentration of monomer and optional comonomer, high temperature and high solid content are three important factors that allow to increase the kinetics of the polymerisation chemical reaction.

The power consumption of the circulation pump normally increases slowly with increasing solid content. When any one of the three parameters just mentioned (monomer and optional comonomer concentration, temperature and solid content) increases above a certain level, depending upon the polymer characteristics and upon the reactor characteristics, it is additionally observed that the level of noise of this power consumption starts increasing gradually and if not properly controlled may provoke the safety shut-down of operations. This behaviour is known as the swelling phenomenon. The same type of behaviour can be observed on other plant control measurements such as, without limitation, the reactor temperature, the slurry density or the temperature change experienced by the cooling water circulating in all or a portion of the cooling jacket.

In this description and in the context of slurry loop polymerisation, swelling is then defined as a phenomenon that is well known to the person in the art and is associated to the onset of a process instability characterised by rapid fluctuations, significantly larger than usual, in several process variables, the most perturbing of which being the pump power. The term rapid in this context means that successive peaks are separated by less than one minute. Whereas normal operations are performed with pump power fluctuating in a range of less than 10 kW, such range may increase by a factor of 10 when swelling is well established. Fluctuations in the pump power consumption are important and if not controlled they can rapidly reach the safety threshold, thereby inducing automatic actions that may include operations shut-down thus ending the polymerisation process. The onset of instability is linked to the transgression of some process limitations associated with measurable process variables such as for example reactor temperature, monomer and/or comonomer concentrations and/or solids concentration in the reactor. Profitability of the plant is however also linked, among other parameters, to those same variables but counter to the stability requirements. There is thus a strong economical incentive to work as close as possible to the multi-dimensional stability boundary with the risk that some natural process fluctuation initiates swelling instability.

Ways of controlling operations at high solids concentrations are known in the prior art. For example, EP-A432555 provides a method for controlling the polymerisation process. This is accomplished by establishing control signals which typify flow rate of diluent fluid required to;

(a) maintain a minimum velocity for the circulating reaction slurry;

(b) maintain a maximum pressure head at a selected point in the reactor and (c) maintain a maximum power level supplied to the circulating pump.

The one of signals (a), (b) and (c) above which requires the greatest flow rate of diluent fluid, is automatically selected to manipulate diluent flow.

Monomer concentration and reactor temperature are usually kept nominally constant to maintain the product quality in the narrow specification required. Increasing solids concentration generally improves the product quality as, at constant reactor throughput, the residence time in the reactor, defined as the mass of solids present in the reactor divided by the production, increases with increasing solids concentration.

It is indeed desired to increase the residence time in the reactor in order to maximize the contact time with the catalyst and to improve the granulometry of the final product. As the mass of solids present in the reactor is defined as the product of the reactor volume by the density of the slurry and by the solid content, and as the density of the slurry is increasing with the solid content, it is thus highly desirable to increase the solid content. Unfortunately, the most usual cause of swelling is high solid content.

For all these reasons, it is desirable to operate the reactor at conditions that are as close as possible to the onset of swelling.

It is an object of the present invention to detect the onset of swelling.

It is another object of the present invention to control and refrain the development of the swelling.

It is also an aim of the present invention to improve the catalyst productivity and therefore the reactor throughput.

It is a further object of the present invention to increase the solids concentration in the reactor or in the settling legs.

It is yet another object of the present invention to increase the production of polymer in a slurry loop reactor.

Accordingly, the swelling is controlled by diluting the reactor medium, said dilution being triggered and controlled by the standard deviation or the variance or the fluctuation range or any other function monotonically related to the variance of a plant control measurement displaying an increasing fluctuation level when swelling occurs.

Contrary to EP-A-432555 that describes the manipulation of diluent fluid rate in order to avoid increase of actual pump power above a pre-determined threshold, the present invention does not aim at controlling the actual values of selected plant control measurements but at controlling the standard deviation of said selected plant control measurements. As can be seen on FIG. 1, swelling, as described here-above, starts developing without significant increase of the actual pump power. The objective of the present invention is to control incipient swelling at an early stage.

The plant control measurements are for example the pump power consumption, the reactor temperature, the slurry density or the temperature difference between the entering and exiting cooling liquid or any combination of such measurements.

LIST OF FIGURES

Figure 1:
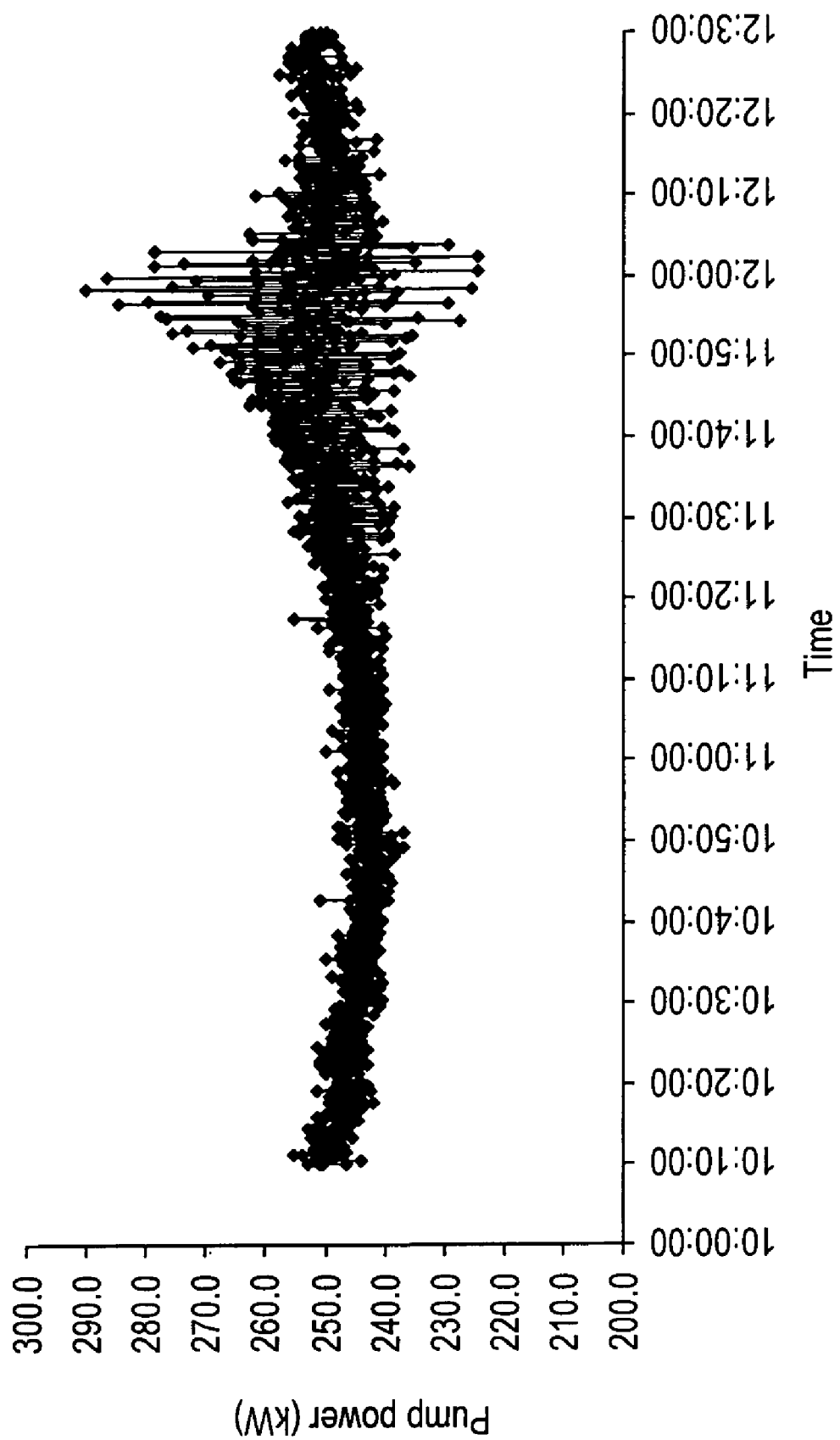
FIG. 1 represents the pump power expressed in kW as a function of time expressed in hours for a loop reactor without by-pass during an uncontrolled swelling.
Figure 2:
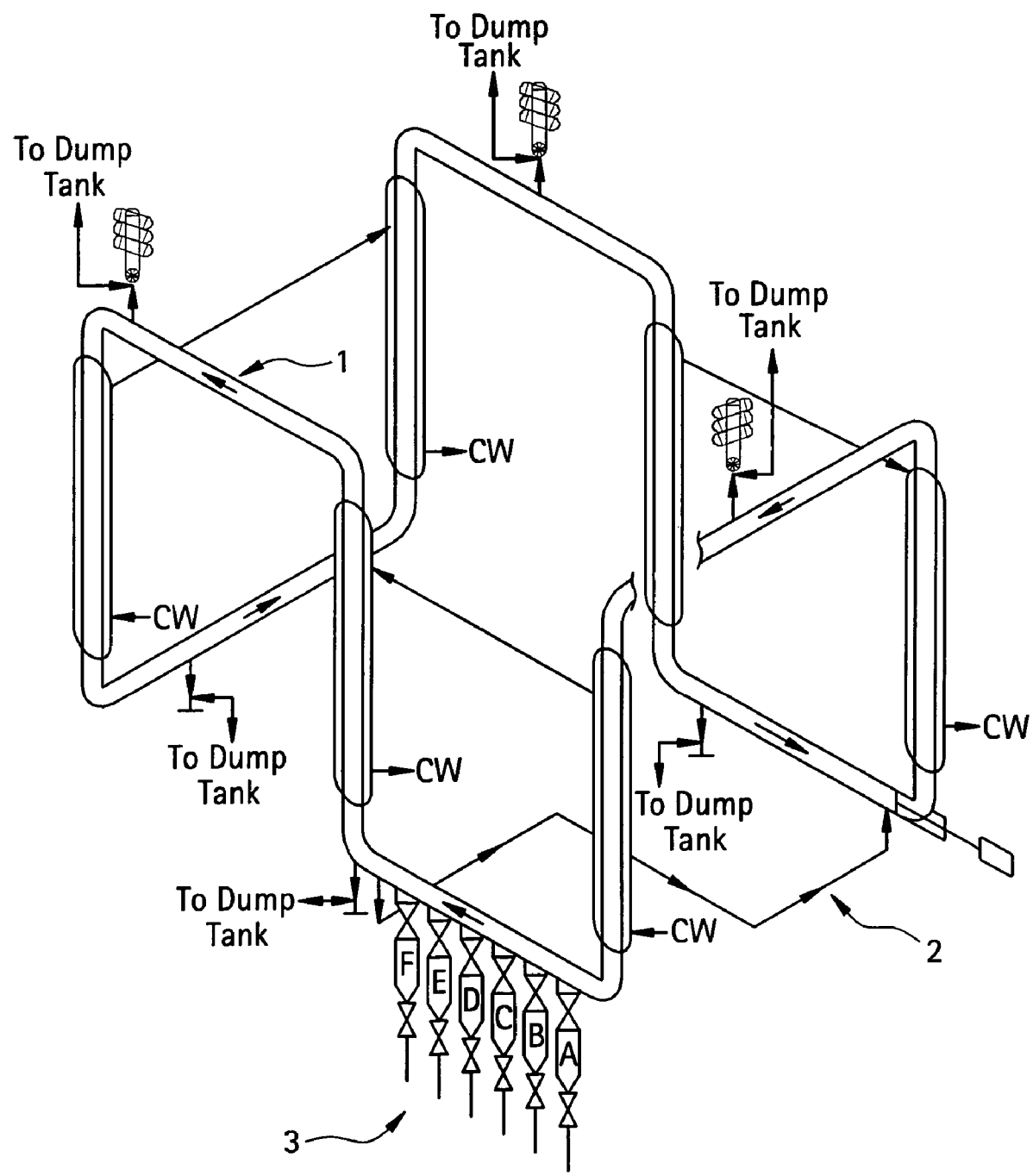
FIG. 2 represents schematically the loop reactor (1) with a by-pass line (2) inserted between two points of the main loop. It also includes the settling legs (3).
Figure 3:
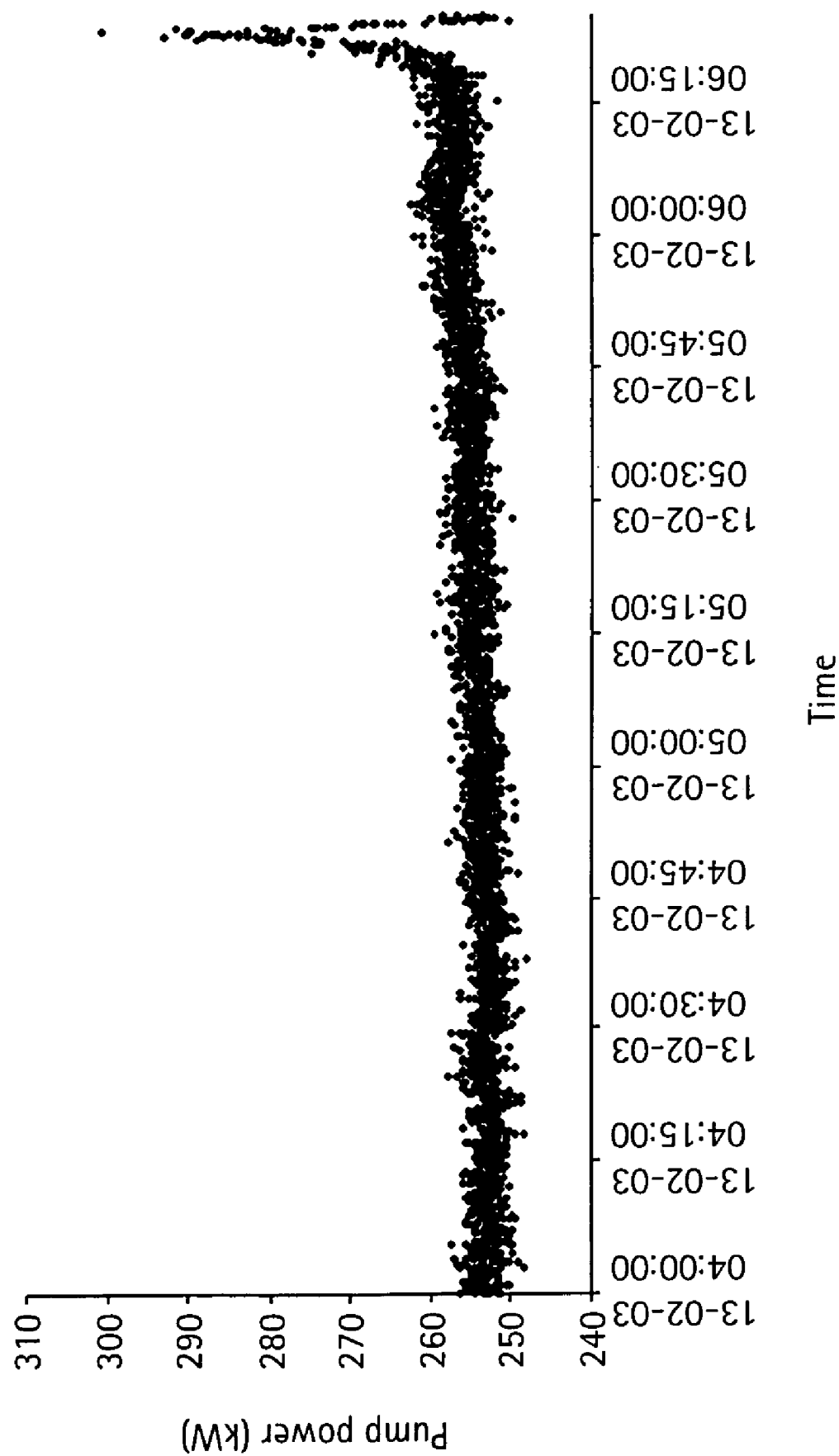
FIG. 3 represents the pump power expressed in kW as a function of time expressed in hours for a loop reactor equipped with a by-pass line during an uncontrolled swelling.
Figure 4:
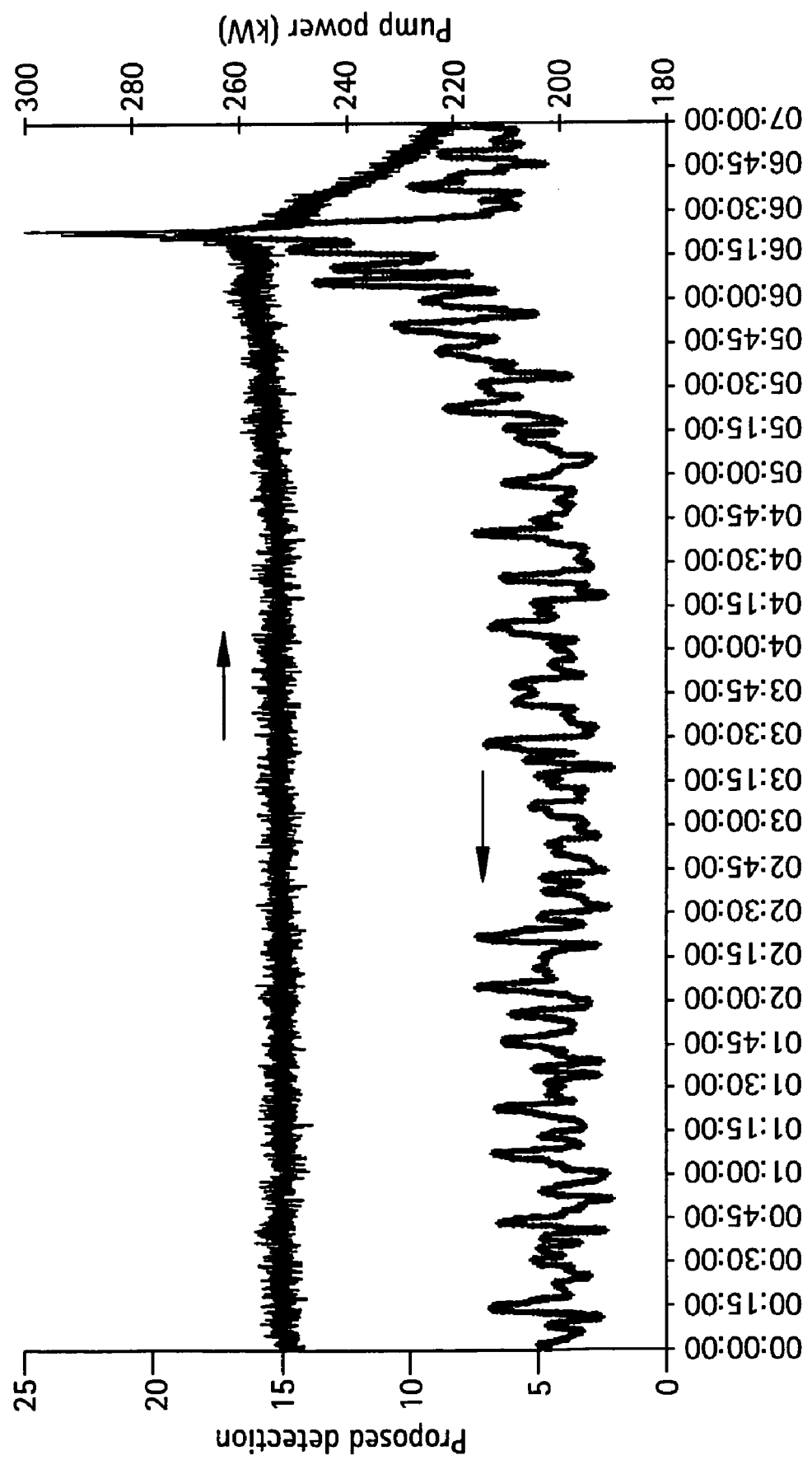
FIG. 4 represents the proposed processed signal used for controlling the dilution of the reactor in the case of the swelling corresponding to FIG. 3. The pump power is displayed on top to allow a better visualisation of the reaction time of the detection.

The pump power consumption in normal operating conditions is displayed on FIG. 1 representing the pump power expressed in kW as a function of time expressed in hours. Typically the pump power consumption is of the order of 200 kW to 800 kW depending on the reactor size and shape and the standard deviation of the signal due to white noise is of the order of 1 to 10 kW. As the solid content increases, the pump power consumption increases very slowly keeping the same level of white noise. When swelling occurs, the standard deviation starts increasing and reaches progressively an unacceptable level causing the system to shutoff as seen on the same FIG. 1.

Other plant control measurements like (but not limited to) the temperature of the reactor, the density of the slurry and the temperature change experienced by the cooling water circulating in all or a portion of the cooling jacket also all exhibit variations in the standard deviation that increases with increasing solids concentration.

Surprisingly, it is found that this fluctuation increase is due to the superposition to the constant white noise of a unique signal characteristic of the reactor. The amplitude of said unique signal progressively increases during the swelling phenomenon.

Several parameters of the signal have been studied such as for example the standard deviation, or the variance, or the fluctuation range, or any other function monotonically related to the standard deviation. Usual mathematical signal treatments, such as for example deconvolution, frequency filtering, standard pattern recognition techniques may be applied to the signal before computation of the variance related detector, depending on the strength of the unique signal characteristic of the reactor just mentioned here above.

The swelling is controlled by diluting the reactor medium, thereby decreasing the solid content and the temperature.

As soon as the signal parameters of pump power consumption increase above a pre-determined threshold, the control loops of the reactor are modified in order to inject more diluent in the reactor. The amount of injected diluent increases progressively up to a new value that is typically twice larger than the starting value. A typical diluent is isobutane. This control scheme is tuned to keep the reactor just at the onset of swelling in order to maximise the solids concentration and thus the yield of the installation.

The present invention thus discloses a method for controlling the swelling that comprises the steps of:
a) providing a loop reactor, said reactor being optionally equipped with one or more devices aimed at improving the homogeneity of the circulating slurry;
b) measuring as a function of time, one or more plant control parameters that displays an increasing level of fluctuation during swelling;
c) processing these measurements in real-time, including amplifying the signal to noise ratio if required;
d) identifying in real-time the onset of swelling;
e) progressively diluting the reactor when the fluctuation level reaches a pre-determined level.

The device aimed at improving the homogeneity of the circulating slurry can be a by-pass line wherein the circulating slurry has a different travel time than in the main line.

The predetermined level is defined as a percentage of the fluctuation level measured at low solid content. This percentage is of less than 300%, preferably of less than 250%, most preferably of less than 180%.

The invention claimed is:

1. A method for controlling swelling in an olefin polymerization loop reactor system comprising:
a) introducing an olefin, a polymerization catalyst, and a diluent carrier liquid into a loop reactor, having an internal circulation pump;
b) supplying power to said circulating pump to circulate said diluent liquid and said olefin through said loop reactor while polymerizing said olefin monomer in the presence of said catalyst system to produce a slurry of polymer particles in said carrier liquid;
c) diverting the flow of said slurry through said loop reactor into at least one settling leg connected to the loop reactor and sequentially discharging polymer particles in the settled slurry from said at least one settling leg to withdraw said polymer particles from said reactor system; and
d) measuring a plant control parameter which displays a progressively increasing level of fluctuation at the onset of swelling characterized by an instability in said polymerization process which results in fluctuations in the measured parameter which progressively increases with time;
e) processing a signal representative of the sensed parameter measurement in real time in order to detect the onset of swelling; and
f) in response to the detection of the onset of swelling, adding a diluent to said reactor to dilute the circulating slurry of polymer particles in said diluent carrier liquid in order to alleviate said swelling condition.

2. The method of claim 1 further comprising diverting polymer slurry from a first location in said loop reactor to a second downstream location in said loop reactor through a bypass line separate from the loop reactor which extends from said first location to said second location.

3. The method of claim 2 wherein the travel time in said bypass line from said first location to said second location is different from the travel time in said loop reactor from said first location to said second location.

4. The method of claim 3 wherein the travel time in said bypass line is less than the travel in said loop reactor.

5. The method of claim 2 wherein said first location is downstream of said settling leg.

6. The method of claim 1 wherein the measured plant control parameter is one of the consumption of power supplied to said circulating pump, the temperature of said slurry within said reactor, the density of said slurry in said reactor, and a change in temperature measured in cooling water circulated through a cooling jacket surrounding at least a portion of said loop reactor.

7. The method of claim 6 wherein the measured plant control parameter is the consumption of power supplied to said circulating pump.

8. The method claim 7 wherein the processing of said signal in subparagraph e) of claim 1 comprises amplifying the signal to noise ratio of said signal.

9. The method of claim 1 wherein the addition of said diluent to said reactor is initiated in response to the detection of a fluctuating value function monotonically related to the variance of said measured plant control parameter.

10. The method of claim 1 wherein the addition of said diluent to said reactor in subparagraph f) is carried out by adding diluent to said reactor in an amount which progressively increases with time.

11. The method of claim 1 wherein said diluent is added to said reactor in subparagraph f) in response to the progressively increasing level of fluctuation in subparagraph d) reaching a predetermined level of fluctuation which is less than 300% of the fluctuation of said measured parameter at a low content of polymer particles in said slurry.

12. The method of claim 11 wherein said predetermined level of fluctuation is less than 180% of the fluctuation level measured at said low content of polymer particles in said slurry.

* * * * *